June 24, 1930.  A. R. McGONEGAL  1,765,930
HYDRAULIC SHOCK ABSORBER
Filed Sept. 8, 1928   2 Sheets-Sheet 1

Inventor
Alfred R. McGonegal,
By Shoemaker & Gardiner
Attorneys

Inventor:
Alfred R. McGonegal
By Smith, Michael & Gardiner
Atty's.

Patented June 24, 1930

1,765,930

UNITED STATES PATENT OFFICE

ALFRED R. McGONEGAL, OF CLARENDON, VIRGINIA, ASSIGNOR TO SEVEN-EIGHTHS TO SAMUEL L. MARSH, OF LOS ANGELES, CALIFORNIA

HYDRAULIC SHOCK ABSORBER

Application filed September 8, 1928. Serial No. 304,821.

My invention relates to hydraulic shock absorbers and is more particularly designed to eliminate what is commonly known as water hammer which is produced by suddenly stopping the flow of water or other fluid passing through the pipe systems.

This application is a continuation in part of my application Serial No. 159,434, filed January 6, 1927, Shock absorbers for water systems.

A stream of water flowing through a line of pipe has energy in which quantity and weight of water, velocity and time are elements. If the flow of water is suddenly cut off and the flow stopped, this energy must be dissipated and it usually takes the form of a thrust or impact on the end of the pipe at the point of stoppage and causes through molecular movement the generation of a wave of density which passes back through the water pipe toward the source of supply gradually dying out in intensity. Its usual effect is to cause intense vibration and movement of the pipes if they are not fastened securely in place or in the case of loose pipes, such as fire hose to transmit shock to the holder thereof. This intense vibration is usually known as water hammer and is objectionable in that it results in the splitting of pipes, stripping of threads and failure of the pipe fittings generally.

It is an object of my invention, therefore, to eliminate or dampen out these objectionable vibrations thereby insuring that no hammer in the pipes will take place.

A further object of my invention is to provide a very simple compact and inexpensive device for accomplishing these results.

Further objects and advantages of the invention will appear as the description proceeds but I desire it to be understood that changes may be made in the proportions or minor details of construction without departing from the spirit or scope of the claims hereinafter appended.

In describing this invention reference will be had to the accompanying drawings in which corresponding parts are similarly numbered throughout the views and in which Figure 1 is a vertical central sectional view of my device, parts thereof being shown in side elevation.

Figure 1:
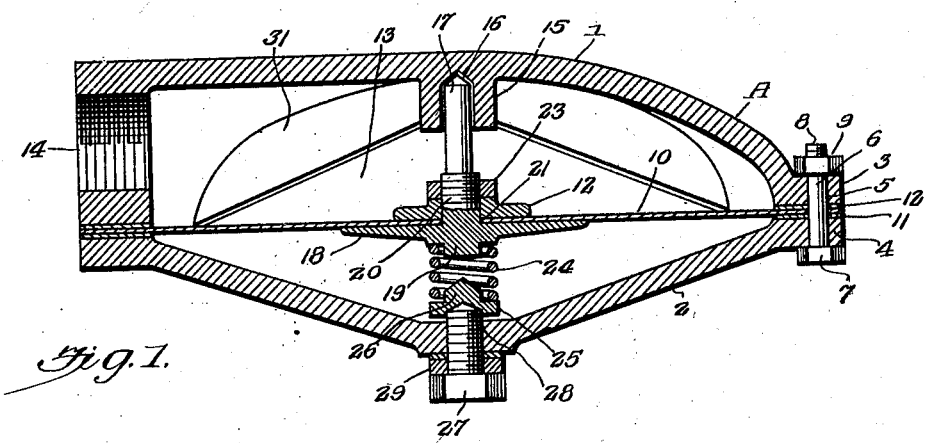
Figure 2:
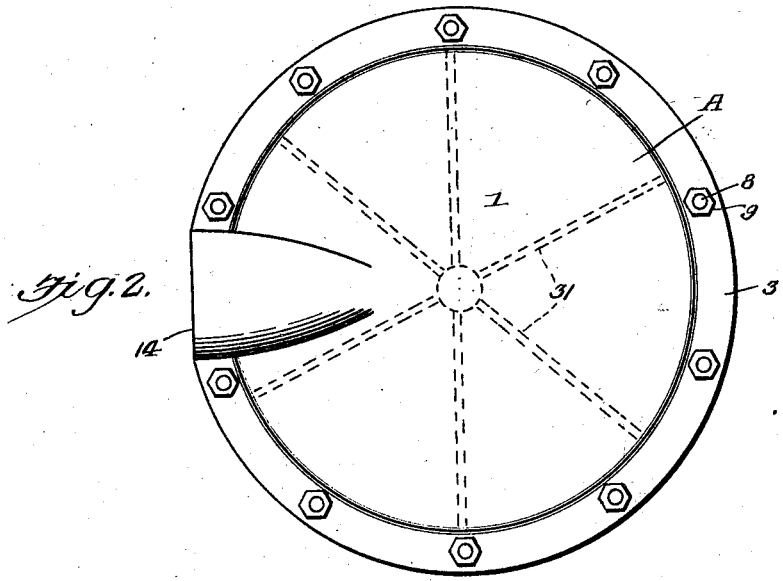
Fig. 2 is a plan view thereof showing in dotted lines the deflecting ribs.

Referring more particularly to the drawings my shock absorber consists of a casing or shell generally indicated at A and comprising an upper shell 1 and a lower shell 2 which are substantially dome-shaped and have at the marginal edges thereof flanges 3 and 4 respectively provided with bolt holes 5 through which are extended the bolts 6 provided at one end with heads 7 and at the other with a screw threaded terminal 8 which is adapted to be engaged by a nut 9.

It will thus be seen that by placing the two margined edges of the shell so that the holes therein align and passing the bolts 6 therethrough the two shells may be securely fastened together as clearly shown in Fig. 1.

Interposed between the marginal flanges 3 and 4 of the shells 1 and 2 is a spring metal diaphragm 10 which may be made of spring copper or other suitable metal and in order to securely mount the diaphragm 10 between the marginal flanges 3 and 4 I provide suitable packing rings 11 and 12 engaging opposite sides of the marginal edge of the diaphragm 10.

This diaphragm 10, as stated before is of spring metal so that it is inherently resilient. This inherent resiliency of itself normally tends to maintain the diaphragm 10 in a horizontal plane and upon distortion thereof due to vibrations taking place within the device the diaphragm 10 is adapted to vibrate freely within the shell and after such vibration ceases to return to its normal horizontal plane.

By making the shell 1 dome-like in construction I provide a water chamber 13 which is placed in communication with the pipe line through the threaded coupling 14 which communicates directly with the chamber 13 and is adapted when in use to permit the chamber 13 to be completely filled with water at all times.

Depending from the interior wall of the shell 1 is a flange 15 providing a recess 16 which is adapted to receive the end of a stop pin 17 therein and it is to be noted that the diameter of the recess 16 is slightly larger than the stop pin 17 for purposes which will hereinafter be described.

The stop pin 17 is rigidly secured to the diaphragm 10 by means of an enlarged circular head 18 bearing against the diaphragm 10 on one side and carrying thereon a stud 19 and having a screw threaded portion 20 projecting through an opening 21 in the diaphragm and having in engagement therewith on the opposite side of the diaphragm the washer 22 which is located in position by means of a nut 23 screw threadedly engaging the threaded portion 20.

Projecting from the screw threaded portion 20 is a pin of reduced diameter which is adapted to fit within the socket 16 in the shell 1.

After long usage of the present device it is found that the head of water acting constantly upon the diaphragm 10 tends to warp the diaphragm out of its horizontal plane. In order to prevent this warpage and maintain the diaphragm 10 constantly in a horizontal plane I provide an adjustment therefor which comprises the spring 24 which encircles the stud 19 on the stop pin and at the other end the spring 24 bears upon the nut 25 which is provided with a conical or other shaped recess 26 therein.

Passing through the shell 2 in axial alignment with the recess 16 in the shell 1 is a bolt 27 provided with a conical end 28 which is adapted to engage the conical socket 26 in the nut 25. Interposed between the bolt 27 and the shell 2 are suitable packings 29 and 30.

It will thus be seen that by adjustment of the nut 27 the tension of the spring 24 is varied in order to take up any warpage of the diaphragm 10 and therefore maintain this diaphragm in horizontal position.

It is here to be pointed out that the primary function of the spring 24 is not to permit the diaphragm 10 to be displaced by the impacts and then return it to normal position since the inherent resiliency of the diaphragm accomplishes this purpose of itself. The spring 24 permits yielding of the diaphragm 10 but its primary function is to take up any warpage occasioned by constant use so that the life of the diaphragm is materially increased and is found to be in efficient condition after long periods of use.

In the interior of the shell 1, and radiating from the depending flange 15 I provide a plurality of vertical ribs 31 which are adapted to deflect the incoming vibrations toward the diaphragm thereby tending to break these vibrations into smaller vibrations which are absorbed by the diaphragm vibration.

Having now described in detail the preferred embodiment of my invention it will be seen that the operation is as follows:

The shell A is secured to the end of a pipe line or wherever the waves of vibration are generated by means of the screw threaded connection 14 so that water at all times fills the chamber 13 and provides no air space therein.

Upon stoppage of the flow of stream through the pipe line the generation of a wave of density is accomplished which passes into the chamber 13 and immediately sets up a vibration of the diaphragm 10 in unison with the vibrations in the stream, in this manner absorbing such vibrations and preventing the transmission thereof back through the pipe line as is normally the case and the damaging effect upon the pipes will be eliminated together with the annoying noise usually present and known as water hammer.

The resilient spring metal diaphragm is usually made many times larger in area than the area of its inlet and a satisfactory proportion has been found to be .785 square inch to 33.183 square inches, but of course it is to be understood that various gauge diaphragms may be employed and various tension springs may be substituted for the spring 24 depending upon the conditions of use and the amount of flow and the volume of water being treated.

Upon entering the chamber 13 the vibrations contact with the vertical ribs 31 and are consequently reflected against the diaphragm at constantly varying angles which in turn reflects at the complements of the angles of incidence with the result that the lines of vibration cross and recross and distort each other and so prevent the escapage from the chamber 13 back into the supply pipe in any well defined waves of density.

Figure 3:
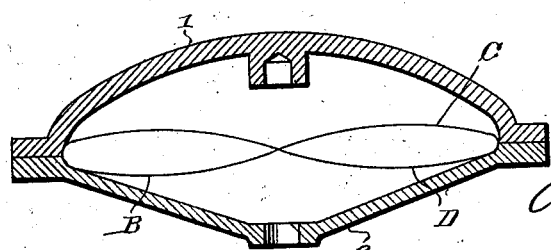
Fig. 3 is a diagrammatic sectional view illustrating the mode of operation of the present device.

It has hereinbefore been stated that the recess 16 receiving the stop pin is slightly larger in diameter than the stop pin. This has been found to be essential due to the fact that the diaphragm has been found to vibrate unequally under certain conditions and as indicated in Fig. 3 the diaphragm 10 on one side of the stop pin 17 might be reacting to the impulse and would assume the position as indicated at B in Fig. 3 while the diaphragm on the opposite side of the stop pin 17 might be under the influence of an impact in the opposite direction in which event it will assume the position as indicated in C in Fig. 3. Consequently the stop pin must assume an angular position with reference to the vertical to accommodate this action of the diaphragm and unless the recess 16 is slightly in excess of the diameter of the stop pin 17 such action would not be permitted.

In the reverse manner the diaphragm might assume the position as indicated by the line D, Fig. 3, but in any event the enlargement of the recess 16 permits such movement to take place.

Due to the fact that the diaphragm 10 is inherently resilient it will be seen that each part of the diaphragm takes up the vibrations contacting therewith but in order to prevent too great a vibration of the diaphragm 10 the stop pin 17 is provided which limits the movement of the diaphragm but permits ample vibration therein to damp out all vibrations entering the chamber 13.

Figure 4:
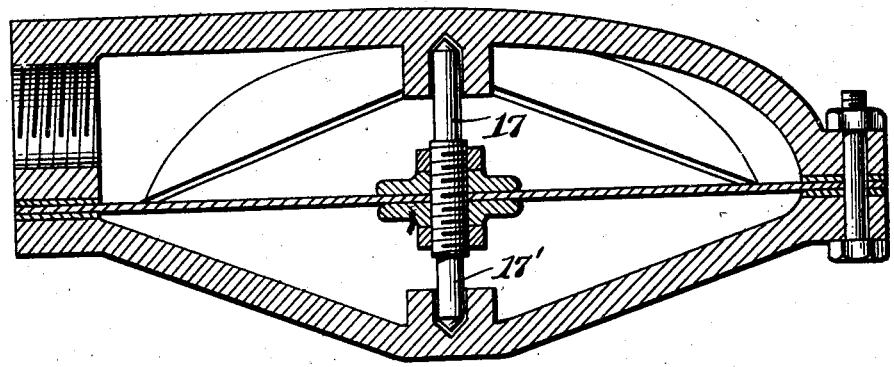
Fig. 4 is a sectional view showing a modified form of construction.
Figure 5:
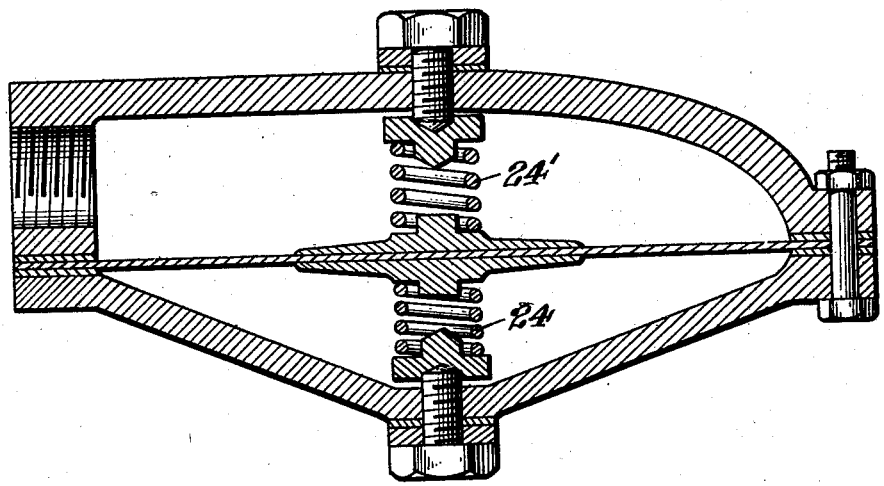
Fig. 5 is a sectional view showing a further modification.

Under certain conditions it has been found that the diaphragm can be used without the necessity of any springs such as spring 24 and in such case an additional stop pin 17' (Fig. 4) of the same construction as the pin 17 projects from the opposite side of the diaphragm and limits the movement in that direction. On the other hand it has been found that spring 24' (Fig. 5) corresponding to spring 24 may be used on opposite sides of the diaphragm and produce equally good results under certain conditions.

In describing the present invention I refer to part 2 as constituting a shell but I do not desire it to be understood that this shell 2 is of solid construction. If desirable a spider may be substituted in place of the shell 2 since it is not necessary to confine air between the shell 2 and the diaphragm 10 because of the fact that I do not rely upon any confined air pocket on one side of the diaphragm for the purpose of permitting displacement of the diaphragm and return thereof to normal position.

As a matter of fact I desire it to be distinctly understood that my invention does not operate on the principle of displacement or additional space for the surge or movement of the water but that my invention is based upon the principle of permitting the resilient diaphragm to vibrate in synchronism with the waves of density in the stream of water.

The inlet 14 is illustrated as entering from the edge or laterally of the shell and it will be readily apparent that the waves of pressure in the fluid stream will, therefore, travel across the diaphragm and be damped out progressively and resiliently transverse of the line of propagation and since every minute portion of the diaphragm acts in reality as an independent diaphragm capable of flexure corresponding to the impact impinging thereon, it follows that the surfaces of the diaphragm may be said to act independently on the impulses passing across the diaphragm.

The diaphragm, therefore, acts as a tympanum and damps out the vibrations progressively, independently and resiliently, substantially transverse to the line of propagation of said vibrating impulses.

Devices of the prior art are known wherein the inlet is arranged axially to the diaphragm, but in such instances the diaphragm moves as a whole to take care of the surge and does not progressively, independently and resiliently absorb each successive impulse.

In devices of the prior art attempt has been made to employ a leather or rubber diaphragm to accomplish the same result but in most instances a confined air pocket has been provided on the opposite side of the diaphragm and the diaphragm serves the purpose of preventing contact between the water and air to prevent absorption of the air by the water.

In these devices of the prior art it has been found that in the course of time the diaphragms lose their resiliency and are warped to such an extent that they fail in operation.

In addition none of the prior art devices of which I am aware employ any means such as my stop pin 17 to prevent too much flexing of the diaphragm. In the absence of some means on the diaphragm to prevent excessive warping thereof it has been found that these diaphragms will blow out or break due to the pressure of water against one side of the diaphragm.

In other devices of the prior art corrugated cylinders or diaphragms have been employed which are adapted to be displaced by the waves of density in order to furnish additional space for the vibration.

It has been found that the use of corrugated diaphragms or cylinders is objectionable in that in time the constant pressure of the water thereagainst tends to flatten out the corrugations thereby permitting a bulge of the diaphragm or cylindrical member and which defeats the purpose for which they are designed.

By the use of my spring metal diaphragm all such objections are overcome and it will be readily seen that I have provided a permanent device which when once installed requires no further attention such as the replenishing of the air in the confined pockets of the prior art devices and which successfully absorbs or damps out water hammer as it occurs and that the life of the spring metal employed in the diaphragm is without limit.

I have described my invention as being used in connection with water systems, but I desire it to be understood that it is equally applicable to oil pumping systems or other fluid systems in which similar conditions exist and while I have indicated that a diaphragm of a certain proportion may be used with reference to the area of the inlet it is to be distinctly understood that the size of the diaphragm is to be varied in accordance with the volume of fluid or the pressure thereof.

What is claimed is:

1. A device for preventing water hammer and the like comprising a shell having an inlet communicating with a pipe system, a flat spring metal diaphragm therein providing a fluid receiving chamber communicating with said inlet, the said diaphragm being adapted to vibrate synchronously with the vibrations in the fluid.

2. A device for preventing water hammer and the like comprising a shell having an inlet communicating with a fluid system, a spring metal diaphragm extending across said shell and providing a fluid chamber communicating with said inlet, the said diaphragm being adapted to vibrate synchronously with the vibrations in the fluid, and means in the fluid chamber for limiting the vibrations of the diaphragm.

3. A device for preventing water hammer and the like comprising a shell having an inlet communicating with a fluid system in which the vibrations are generated, a spring metal diaphragm in said shell providing a fluid receiving chamber communicating with said inlet, the said diaphragm being adapted to vibrate synchronously with the vibrations in the fluid system, means for limiting the vibrations of the diaphragm, and means for maintaining said diaphragm in its normal plane.

4. A device for preventing water hammer and the like comprising a shell having an inlet communicating with a fluid system in which vibrations are generated, a spring metal diaphragm therein extending across said shell and providing a fluid receiving chamber communicating with said inlet, and means on said shell for breaking up said vibrations in the fluid and directing the same against said diaphragm.

5. A device for preventing water hammer and the like comprising a shell having an inlet communicating with a fluid system in which vibrations are generated, a spring metal diaphragm in said shell providing a fluid receiving chamber communicating with said inlet, the said diaphragm being adapted to vibrate synchronously with the vibrations in the fluid, deflecting ribs on said shell extending into said fluid chamber whereby the vibrations in the fluid are directed against the diaphragm at constantly varying angles.

6. A device for preventing water hammer and the like comprising a shell having an inlet communicating with a fluid system in which vibrations are generated, a spring metal diaphragm in said shell providing a fluid chamber communicating with said inlet, the said diaphragm being adapted to vibrate synchronously with vibrations in the fluid, means for limiting vibrations of the diaphragm, and means on said shell for breaking up the vibrations in the fluid and directing the same against the diaphragm.

7. A device for preventing water hammer and the like comprising a shell having an inlet communicating with a fluid system in which vibrations are generated, a spring metal diaphragm extending across said shell and providing a fluid chamber communicating with said inlet, a stop pin rigidly secured to said diaphragm and engaging the shell to limit the vibration of the diaphragm.

8. A device for preventing water hammer and the like comprising a shell having an inlet communicating with a fluid system in which vibrations are generated, a spring metal diaphragm extending across said shell and providing a fluid chamber communicating with said inlet, a stop pin projecting from one side of said diaphragm and engaging the casing to limit vibrations of the diaphragm, and spring means on the opposite side of said diaphragm for returning the same to its normal plane.

9. A device for preventing water hammer and the like comprising a shell having an inlet communicating with a fluid system in which vibrations are generated, a spring metal diaphragm extending across said shell and providing a fluid chamber communicating with said inlet, a stop pin on said diaphragm engaging said shell to limit vibrations of the diaphragm, adjustable means for returning the diaphragm to its normal plane, and deflecting ribs on said shell extending into said fluid chamber and adapted to break up the vibrations in the fluid chamber and direct the same at constantly varying angles against said diaphragm, said diaphragm being adapted to vibrate synchronously with the vibrations in the fluid.

10. A device for preventing water hammer and the like comprising a shell having a lateral inlet in which vibrations are generated, a spring metal diaphragm extending across said shell in a plane substantially parallel with the plane of the inlet, said diaphragm being adapted to vibrate synchronously with the vibrations in the fluid and in a direction substantially transverse to the line of propagation of said vibrations.

11. The method of preventing water hammer or the like in closed fluid systems comprising directing vibratory fluid pressure impulses into a chamber and resiliently and progressively damping out the increments of said vibrations within the chamber by a movement substantially transversely of the line of propagation thereof.

12. The method of preventing water hammer or the like in fluid systems comprising directing vibratory fluid pressure impulses into a chamber and progressively and independently damping out said vibrations within the chamber by a movement substantially transversely of the line of propagation.

13. The method of damping out successive waves of density in a closed fluid pressure system consisting of progressively and resiliently opposing said waves in a direction substantially transversely to the line of propagation thereof.

In testimony whereof I have hereunto set my hand.

ALFRED R. McGONEGAL.